United States Patent [19]

Trejo et al.

[11] Patent Number: 4,532,725
[45] Date of Patent: Aug. 6, 1985

[54] COMBINED SNOW PLOW, GRASS CUTTER & TILLER WITH ADJUSTABLE CHAIR

[76] Inventors: Jesse Trejo; George Spector, both of 233 Broadway, Rm 3615, both of New York, N.Y. 10007

[21] Appl. No.: 632,595

[22] Filed: Jul. 19, 1984

Related U.S. Application Data

[63] Continuation-in-part of Ser. No. 198,775, Oct. 20, 1980, abandoned.

[51] Int. Cl.³ .............................................. E01H 5/09
[52] U.S. Cl. ...................................... 37/243; 56/16.9
[58] Field of Search .................. 37/221, 222, 241–243; 56/16.9, 2; 180/15, 9.5

[56] References Cited

U.S. PATENT DOCUMENTS

| | | | |
|---|---|---|---|
| 2,722,280 | 11/1955 | Ballu | 180/9.5 |
| 2,770,894 | 11/1956 | Gettlemen | 56/16.9 |
| 2,855,060 | 10/1958 | Colburn | 37/241 |
| 2,998,082 | 8/1961 | Arnot | 56/16.9 |
| 3,349,861 | 10/1967 | Oral | 180/15 |
| 3,423,856 | 1/1969 | Fisue | 37/241 |
| 3,475,056 | 10/1969 | Jones | 37/222 |
| 3,630,010 | 12/1971 | Rester | 56/2 |
| 3,779,319 | 12/1973 | Pease | 37/223 X |
| 3,945,176 | 3/1976 | Ucendeje | 56/16.9 |
| 4,104,812 | 8/1978 | Stribiak, Jr. | 37/243 |

*Primary Examiner*—E. H. Eickholt

[57] ABSTRACT

A rideable work apparatus having attachments that include a snow plow, a lawn mower and a roto-tiller simultaneously mounted to a frame. Cranks are provided for selectively actuating each of the attachments. A seat for the operator is connected to the cranks by a threaded rod so that when an attachment is actuated by the crank, the crank turns the threaded rod and causes the seat to displace towards the chosen attachment which shifts the center of gravity and achieves better contact between the chosen attachments and the working surface.

8 Claims, 9 Drawing Figures

U.S. Patent  Aug. 6, 1985  4,532,725
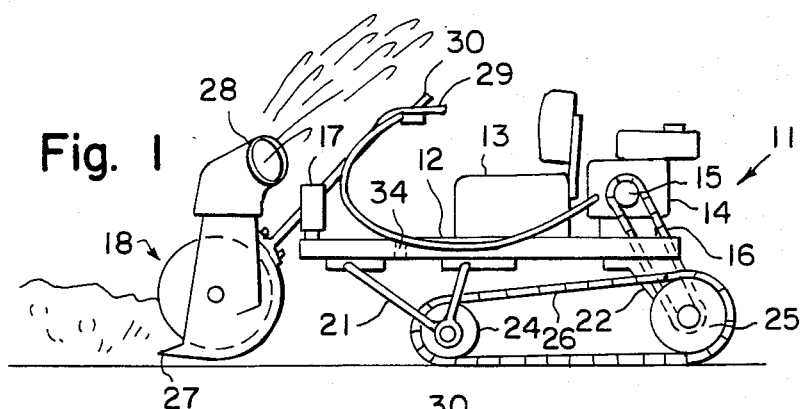
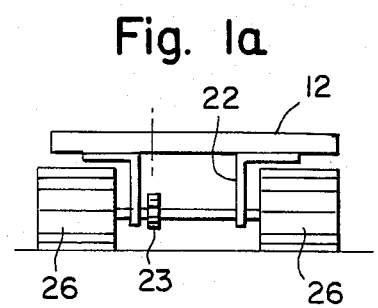
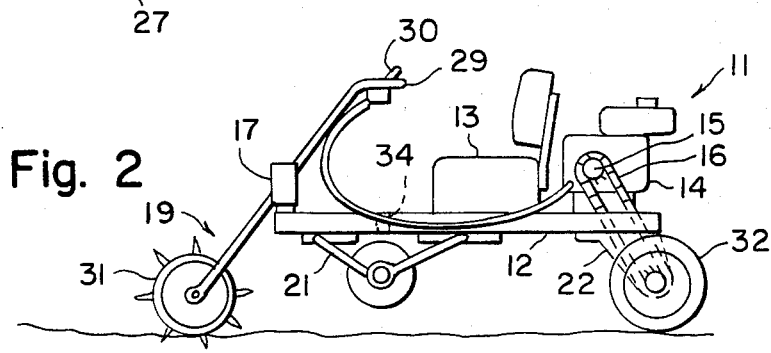
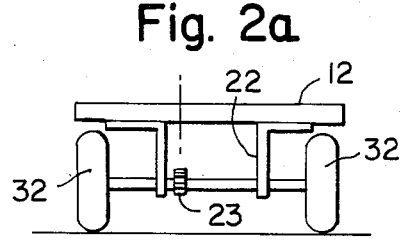
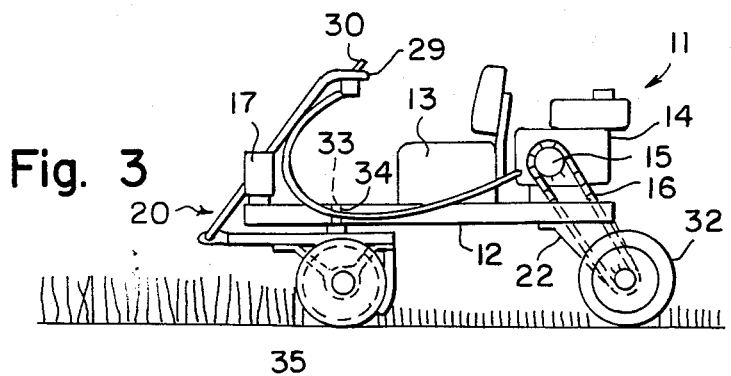
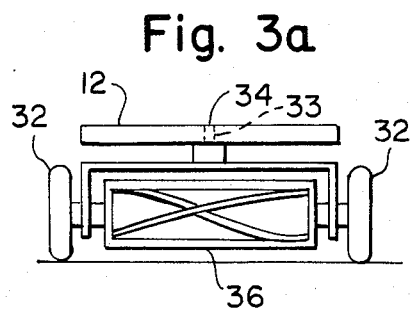
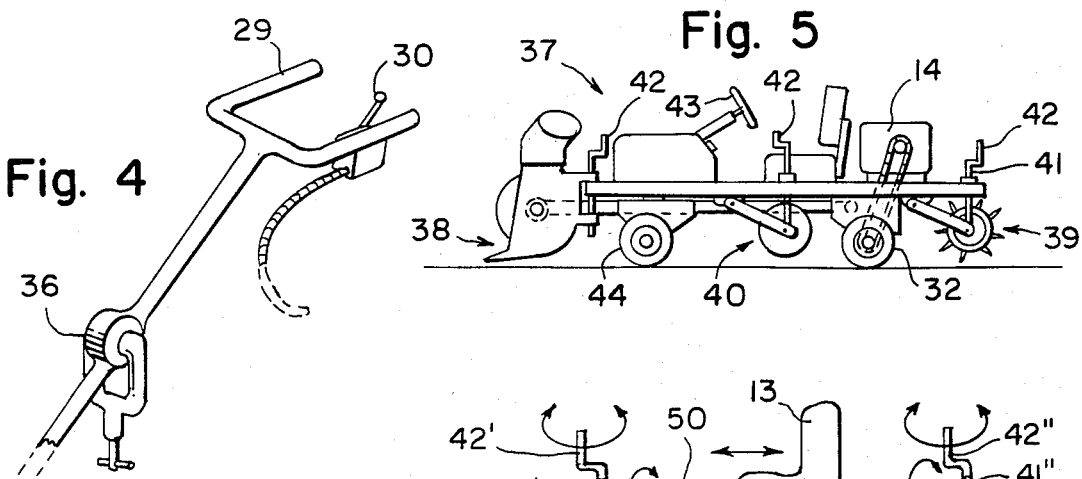
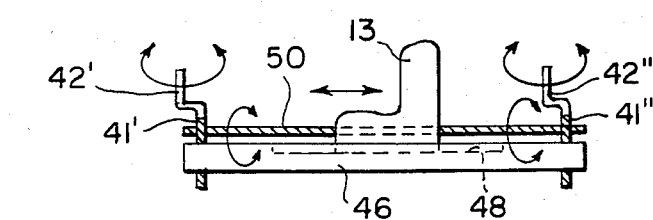

COMBINED SNOW PLOW, GRASS CUTTER & TILLER WITH ADJUSTABLE CHAIR

BACKGROUND OF THE INVENTION

This application is a continuation-in-part application of copending application Ser. No. 198,775 filed Oct. 20, 1980 now abandoned.

The present invention relates to out-of-door or yard work apparatus. More particularly it relates to an out-of-door or yard work apparatus that has a snow-plow, grass cutter and a roto-tiller attached thereon.

It is well known that conventional private home requires certain out of door chores for maintaining the home in an attractive, useful and accessible condition throughout various seasons of the year. If professional services are not hired for snowplowing or grass cutting, then these most common of maintainance chores must be done by the home resident himself, with his own equipment. The purchase of different equipment for each different chore can be expensive.

Inventions to accomplish the above mentioned general tasks are known in the art.

The U.S. Pat. No. 3,630,010 to Rester teaches a multi-use mini bike that is rideable by an operator and permits multiple uses by providing a mini bike construction to which selectively only a lawn mower and a soil tiller can be attached, and wherein the primary function as a mini bike for road or trail use is not distracted from.

The U.S. Pat. No. 2,770,894 to Gettleman teaches a snow remover of the rotary type which is not rideable by an operator but rather pushable and permits the interchangeable and not simultaneous attachment of only a snow blower and a lawn mower.

The U.S. Pat. No. 3,945,176 to Vicendese et al teaches a combination power driven lawn-mower aerator which is not rideable by an operator but rather pushable and permits the simultaneous attachment of only a lawn mower and a seed driller.

SUMMARY OF THE INVENTION

Accordingly, it is a primary object of the present invention to provide an out of door or yard working apparatus that avoids the disadvantages of the prior art.

Another object of the present invention is to provide a single rideable apparatus which is inexpensive and can do several different chores such as snow plowing, grass cutting and also roto-tilling, so as to save on separate purchasing, and also save on storage space for separate apparatus.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is an elevational view of the present invention with the snow-blower attached thereon and including caterpiller tracks around the wheels so to travel in snow;

FIG. 1a is a rear view of the caterpiller tracks according to FIG. 1.

FIG. 2 is an elevational view of the present invention with the roto tiller attached thereon for roto-tilling the ground;

FIG. 2a is a rear view of the present invention according to FIG. 2 showing the machine now equipped with rubber tire wheels for travel on the ground while roto-tilling;

FIG. 3 is an elevational view of the present invention with the lawn mower attached thereon to the front end;

FIG. 3a is a front view of the lawn mower attachment according to FIG. 3;

FIG. 4 is a perspective fragmentary detail view of a steering post of the present invention and which includes means for controlling the depth of the work being done;

FIG. 5 is an elevational view of an alternate embodiment of the present invention in which the snow blower, roto-tiller and grass cutter, are simultaneously and not interchangeably attached to the machine, but wherein each vertically adjustable so that each can selectively be used; the figure shows the snow blower lowered for use, while the grass mower and roto-tiller are raised in a retracted inoperative position; the units being raised (retracted) either electrically or by mechanical cranks; and each unit being selectively driven by a removable chain, powered by an AC-DC electric motor; and FIG. 6 is an elevational fragmentary detail view of another alternate embodiment of the present invention, where the seat of the embodiment according to FIG. 5 is moveably mounted on the frame through a plurality of positions and moves by the action of the attachment actuating cranks.

DETAILED DESCRIPTION OF THE PREFERRED EMBODIMENT

Referring now the drawing in greater detail, and more particularly to FIGS. 1 through 4 thereof, at this time, there is shown a vehicle 11 having a frame or chassis 12 upon which there is mounted an operator's seat 13 and an A.C. D.C. motor 14, or else an engine as shown. A gear 1, or pulley 15 on the power plant shaft is engages by an endless chain or a belt 16 for powering the vehicle in its various uses.

A steering transmission unit 17 is mounted upon a front end of the chassis or frame, and various units are removeably attachable thereto, such as a snow plow 18 shown in FIG. 1, a front carriage 20 for use when cutting grass, as shown in FIG. 3.

The frame 12 also includes a front carriage 21 which is for supporting the front of the chassis when snow plowing, or which is retractable when not in use such as when roto-tilling, or which is completely removeable from the frame such as when grass mowing and is replaced by the steerable carriage 20.

The frame also includes a rear carriage 22 carrying a rear axle on which a gear of pulley 23 is mounted and powered by the power unit 14.

When used for snow plowing, rollers 24 and 25 are mounted on the front and rear carriages and an endless caterpiller track 26 is mounted around the rollers so the vehicle has traction to travel on snow. The snow plow unit includes a steering handle 29 and a control 30 to the power plant.

When used for roto-tilling, the unit 18 is replaced by a unit 19 mounted on the transmission unit 17; the unit 19 includes a roto-tiller toothed disc 31 and also the control 30 mounted on the handle 29. The front carriage is upwardly retracted, so that the front of the vehicle is supported on the steerable disc. Rubber tired wheels 32 are mounted on the rear carriage axle.

When used for lawn mowing, the unit 19 is replaced by the unit 20 which is freely pivotable about a post 33 thereof received in a hole 34 of the chassis. The unit 20 includes wheels 35 for travel on grass, and it also includes the handle 29 and the control 30. A grass cutting reel 36 is mounted additionally on the axle of the rear carriage.

FIG. 4 illustrates a simple design of steering transmission 36 that involves no gearing, and accordingly adaptable for lighter equipment that is easier to steer.

FIG. 5 illustrates another design of vehicle 37 wherein a snow plow unit 38, a roto-tiller unit 39 and a grass cutter unit 40 are simultaneously mounted on the vehicle and each unit is vertically adjustable between retracted and operative positions by being threaded on a screw 41 turned by a hand-crank 42. The vehicle includes the motor 14, the driver's seat 13, and, also steering wheel 43 for turning front wheels 44.

FIG. 6 illustrates another embodiment of the vehicle 37 which also has all the attachments simultaneously mounted. The seat 13 is moveably mounted to the vehicle frame 46 so that is can either move forwardly or backwardly. The seat 13 slides in a track 48 disposed in the vehicle frame 46. A threaded rod 50 is threaded through the bottom of seat 13. The ends of the threaded rod 50 threadably engage the screw threads 41', 41" of the attachment actuating cranks 42', 42" respectively. When the crank 42' is turned, the forwardly mounted attachment is lowered to the operated position. As the crank 42' turns, the screw thread 41' turns which is threadably engages with the threaded rod 50 and therefore causes the threaded rod 50 to turn. As the threaded rod 50 turns, the seat 13, being threadably mounted to the threaded rod 50, displaces in the tracks 48 in the forward direction. As the seat 13 moves towards the forwardly lowered operated attachment, the center of gravity of the vehicle and the operator is moved forward and therefore provides more weight over the lowered operated attachment and increases its contact with the working surface. As the forward attachment is raised (retracted) the seat 13 will return to its neutral position, where it will provide better surface contact for the intermediately mounted attachment. As the rearwardly attachment is lowered through the crank 42" and the threaded screw 41", the seat 13 will similarly displace via the threaded rod 50 towards the rearward direction and provide better contact between the rear mounted attachment and the working surface.

It will be understood that each of the elements described above, or two or more together, may also find a useful application in other types of constructions differing from the types described above.

While the invention has been illustrated and described as embodied in an A.C.-D.C. snow plow, grass cutter and roto-tiller, it is not intended to be limited to the details shown, since various modifications and structural changes may be made without departing in any way from the spirit of the present invention.

Without further analyis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A work apparatus, rideable by an operator, and having a center of gravity, and snow plow, lawn mower and roto-tiller attachments all being simultaneously mounted thereon for selective contact with a working surface, comprising:
   (a) a frame;
   (b) a plurality of attachments all being simultaneously mounted to said frame and including a snow plow, a lawn mower, and a roto-tiller;
   (c) means for selectively activating each of said simultaneously mounted snow plow attachment, lawn mower attachment, and roto-tiller attachment between retracted and operated positions;
   (d) a seat adaptable for the operator and mounted to said frame for movement through a plurality of positions; and
   (e) means for connecting said moveable seat to said attachment actuating means, so that when said attachment activating means lowers a respective one of said plurality of attachments to said operated position said moveable seat automatically displaces towards said respective one of said plurality of attachments that is in said operated position so that the center of gravity of the work apparatus and the operator is shifted closer to said respective one of said plurality of attachments that is in said operated position and increases contact between said respective one of said plurality of attachments that is in said operated position and the working surface.

2. The work apparatus as defined in claim 1, wherein said attachment actuating means includes cranks and threaded screws.

3. The work apparatus as defined in claim 1, wherein said connecting means includes a threaded rod attached between said attachment actuating means of said snow plow and roto-tiller.

4. The work apparatus as defined in claim 1, wherein said frame has a front portion to which is attached said snow plow attachment, a rear portion to which is attached said roto-tiller attachment, and an intermediate portion to which is attached said lawn mower attachment.

5. The work apparatus as defined in claim 1, wherein said moveable seat has a forward position in the vicinity of said snow plow attachment, a rear position in the vicinity of said roto-tiller attachment, and an intermediate position in the vicinity of said lawn mower.

6. The work apparatus as defined in claim 1; further comprising a D.C.-A.C. motor mounted on said frame and propelling the work apparatus and powering said plurality of attachments; and a steering handle mounted to said frame.

7. The work apparatus as defined in claim 1; further comprising a plurality of wheels rotatably mounted to said frame and adaptable to receive at least one caterpiller thread.

8. The work apparatus as defined in claim 1, wherein each of said plurality of attachments are in said operated position when each are downwardly extended and are inoperative when each are in said retracted position.

* * * * *